United States Patent
Hasegawa et al.

(10) Patent No.: US 8,271,169 B2
(45) Date of Patent: Sep. 18, 2012

(54) CONTROL APPARATUS AND CONTROL METHOD FOR AN AUTOMATIC TRANSMISSION, PROGRAM FOR DIRECTING A COMPUTER TO EXECUTE THE CONTROL METHOD, AND STORAGE MEDIUM ON WHICH PROGRAM IS RECORDED

(75) Inventors: Yoshio Hasegawa, Chiryu (JP); Takaaki Tokura, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 455 days.

(21) Appl. No.: 12/438,015

(22) PCT Filed: Aug. 10, 2007

(86) PCT No.: PCT/IB2007/002313
§ 371 (c)(1),
(2), (4) Date: Feb. 19, 2009

(87) PCT Pub. No.: WO2008/026028
PCT Pub. Date: Mar. 6, 2008

(65) Prior Publication Data
US 2010/0168970 A1 Jul. 1, 2010

(30) Foreign Application Priority Data
Aug. 28, 2006 (JP) ................................ 2006-230523

(51) Int. Cl.
*G06F 7/00* (2006.01)
*G06F 17/00* (2006.01)
*G06F 19/00* (2011.01)
(52) U.S. Cl. ................ 701/62; 701/51; 701/57; 701/58; 701/60; 701/61; 700/28; 477/34; 477/51; 477/114

(58) Field of Classification Search ............... 701/51, 701/55–60, 62, 65, 66; 700/28–33, 37, 46, 700/49, 50; 477/70, 71, 77–80, 83–89, 109, 477/120, 174, 175; 318/561
See application file for complete search history.

(56) References Cited

U.S. PATENT DOCUMENTS
5,505,675 A * 4/1996 Kuriyama et al. ............ 477/156
(Continued)

FOREIGN PATENT DOCUMENTS
EP 0 588 627 A1 3/1994
(Continued)

OTHER PUBLICATIONS
"Notification of Reason(s) for Refusal" in Japanese Patent Application No. 2006-230523, filed Aug. 28, 2006 (Drafting date: Aug. 11, 2008).
(Continued)

*Primary Examiner* — Thomas Tarcza
*Assistant Examiner* — Rami Khatib
(74) *Attorney, Agent, or Firm* — Finnegan, Henderson, Farabow, Garrett & Dunner, LLP (57) ABSTRACT

An ECU executes a program that outputs a shift command when a determination has been made to perform a power-on downshift (i.e., YES in S100); controls the hydraulic pressure supplied to a friction engagement element to perform the power-on downshift; allows the correction of the hydraulic pressure supplied to the friction engagement element during the power-on downshift when the difference between a target input torque and an estimated input torque is equal to or less than a threshold value ΔTT (1) (i.e., YES in S130); and correcting the hydraulic pressure supplied to the friction engagement element during the power-on downshift.

11 Claims, 9 Drawing Sheets

U.S. PATENT DOCUMENTS

| | | | | |
|---|---|---|---|---|
| 5,573,476 | A | * | 11/1996 | Minowa et al. ............... 477/109 |
| 5,667,457 | A | * | 9/1997 | Kuriyama et al. ............ 477/156 |
| 5,772,555 | A | * | 6/1998 | Minowa et al. ............... 477/109 |
| 5,776,030 | A | * | 7/1998 | Minowa et al. ............... 477/109 |
| 5,779,594 | A | * | 7/1998 | Minowa et al. ............... 477/156 |
| 7,131,931 | B2 | * | 11/2006 | Lutz et al. ..................... 477/159 |
| 2004/0053745 | A1 | | 3/2004 | Sakamoto et al. |

FOREIGN PATENT DOCUMENTS

| | | |
|---|---|---|
| JP | 62-173337 | 7/1987 |
| JP | 02-154856 | 6/1990 |
| JP | 8-285065 | 11/1996 |
| JP | 9-152025 | 6/1997 |
| JP | 2000-291792 | 10/2000 |
| JP | 2000-320363 | 11/2000 |
| JP | 2002-340164 | 11/2002 |
| JP | 2006-348985 | 12/2006 |

OTHER PUBLICATIONS

Notification of Reason(s) for Refusal dated Apr. 27, 2010, for Japanese Appl. No. 2006-230523.

* cited by examiner

|  | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGED
× RELEASED
◎ ENGAGED WHEN ENGINE BRAKE IS ON
△ ENGAGED ONLY WHEN DRIVING

CONTROL APPARATUS AND CONTROL METHOD FOR AN AUTOMATIC TRANSMISSION, PROGRAM FOR DIRECTING A COMPUTER TO EXECUTE THE CONTROL METHOD, AND STORAGE MEDIUM ON WHICH PROGRAM IS RECORDED

CROSS-REFERENCE TO RELATED APPLICATIONS

This application is a national phase application of International Application No. PCT/IB2007/002313, filed Aug. 10, 2007, and claims the priority of Japanese Application No. 2006-230523, filed Aug. 28, 2006, the contents of both of which are incorporated herein by reference.

BACKGROUND OF THE INVENTION

1. Field of the Invention

The invention relates to a control apparatus and control method for an automatic transmission, a program for directing a computer to execute the method, and a storage medium on which the program is recorded. More particularly, the invention relates to technology for correcting the hydraulic pressure supplied to a friction engagement element during a gear shift.

2. Description of the Related Art

Automatic transmissions establish a gear speed by engaging a friction engagement element operated by hydraulic pressure. Such automatic transmissions have individual differences in terms of dimensions and characteristics. Therefore, for example, during a gear shift, hydraulic pressure according to control is not always supplied to the friction engagement element. If hydraulic pressure according to the control is not supplied to the friction engagement element, it may result in large shift shock or poor shift response. Therefore, the hydraulic pressure supplied to the friction engagement element is corrected based on the state of the automatic transmission, such as the input shaft rotational speed of the automatic transmission, during a gear shift.

When the automatic transmission shifts, control to suppress torque output from the power source, for example, may be performed simultaneously. In this case, the state of the automatic transmission during the gear shift may change irrespective of the hydraulic pressure supplied to the friction engagement element. As a result, the hydraulic pressure may be corrected erroneously. To avoid this, technology has been proposed that prohibits a hydraulic pressure correction when the state of the automatic transmission may change due to a different external factor than the hydraulic pressure supplied to the friction engagement element.

Japanese Patent Application Publication No. JP-A-8-285065 describes a shift control apparatus for a vehicular automatic transmission that is provided with a learning portion. This learning portion corrects the hydraulic pressure when releasing a hydraulic type friction engagement device that is released to suppress the amount of overshooting of the engine speed that is generated during a clutch-to-clutch shift in which a predetermined hydraulic friction engagement device, from among a plurality of hydraulic friction engagement devices provided in the automatic transmission, is released while at the same time another hydraulic friction engagement device is engaged. The shift control apparatus also includes a vehicle-state determining portion and a learning-correction prohibiting portion. The vehicle-state determining portion determines whether the vehicle is in a preset reference running state. The learning-correction prohibiting portion prohibits a learning correction by the learning portion when the vehicle state determining portion has determined that the vehicle is not in the reference running state.

According to the shift control apparatus described in Japanese Patent Application Publication No. JP-A-8-285065, a learning correction is prohibited when it is determined that the vehicle is not in the preset reference running state. As a result, a learning correction is prohibited when the vehicle is running in a state which may affect the amount of overshooting of the engine speed that is generated during the clutch-to-clutch shift under fixed conditions, for example. Therefore, learning control based on an erroneous overshooting amount, including the amount of fluctuation due to external factors, is not performed.

However, if a correction of the hydraulic pressure is prohibited while the vehicle is running in a state that may affect the amount of overshooting of the output shaft rotational speed of the power source, i.e., while the vehicle is running in a state in which the state of the automatic transmission may change, as in the shift control apparatus described in Japanese Patent Application Publication No. JP-A-8-285065, the opportunities to correct the hydraulic pressure are that much fewer. In recent years, there has been a trend to increase the number of gear speeds in automatic transmissions, and if there are fewer opportunities to correct the hydraulic pressure, the number of shifts in which there is no opportunity to correct the hydraulic pressure will increase.

SUMMARY OF THE INVENTION

This invention thus provides a control apparatus and control method for an automatic transmission, a program for directing a computer to perform the method, and a storage medium on which the program is recorded.

A first aspect of the invention relates to a control apparatus of an automatic transmission that establishes a gear speed by engaging a friction engagement element that is operated by hydraulic pressure. This control apparatus includes a hydraulic pressure controlling portion that controls hydraulic pressure supplied to the friction engagement element; a determining portion that determines whether a correction of the hydraulic pressure supplied to the friction engagement element during a gear shift is allowed based on a target torque to be input to the automatic transmission during a gear shift and an actual input torque that is actually input to the automatic transmission; and a hydraulic pressure correcting portion that corrects the hydraulic pressure based on a state of the automatic transmission during the gear shift when the determining portion determines that the correction is allowed.

A second aspect of the invention relates to a control method of an automatic transmission that establishes a gear speed by engaging a friction engagement element that is operated by hydraulic pressure. This control method includes a) controlling the hydraulic pressure supplied to the friction engagement element; b) determining whether a correction of the hydraulic pressure supplied to the friction engagement element during a gear shift is allowed based on a target torque to be input to the automatic transmission during the gear shift and an actual input torque that is actually input to the automatic transmission; and c) correcting the hydraulic pressure based on a state of the automatic transmission during the gear shift when the determining portion determines that the correction is allowed.

According to the first or second aspects of the invention, the hydraulic pressure supplied to the friction engagement element is controlled. A determination whether to correct the hydraulic pressure supplied to the friction engagement element during the gear shift is made based on the target torque to be input to the automatic transmission during the gear shift and the actual input torque that is actually input to the automatic transmission. For example, a determination to allow a hydraulic pressure correction may be made when the difference between the target torque and the actual input torque is equal to or less than a predetermined value. Also, a determination to allow the hydraulic pressure correction may be made when a value obtained by integrating the difference between the target torque and the actual input torque over a predetermined period of time is equal to or less than a predetermined value. When a determination to allow a hydraulic pressure correction has been made, the hydraulic pressure is corrected based on the state of the automatic transmission during the gear shift. As a result, even if the input torque of the automatic transmission changes such that the state of the automatic transmission during the gear shift may change, the hydraulic pressure can still be corrected if the input torque is stably increasing. Accordingly, a control apparatus or control method of an automatic transmission can be provided which inhibits a decrease in the number of opportunities to correct the hydraulic pressure.

In the control apparatus of an automatic transmission according to the first aspect of the invention, the determining portion may make a determination to allow the hydraulic pressure correction when a difference between the target value and the value according to torque that is actually input to the automatic transmission is equal to or less than a predetermined value.

In the control method of an automatic transmission according to the second aspect of the invention, in step b), correction of the hydraulic pressure is allowed when a difference between the target torque and the actual input torque is equal to or less than a predetermined value.

According to this structure or method, a determination to allow a hydraulic pressure correction is made when the difference between the target value and the value according to torque that is actually input to the automatic transmission is equal to or less than a predetermined value. As a result, even if the input torque of the automatic transmission changes such that the state of the automatic transmission during the gear shift may change, the hydraulic pressure can still be corrected if the input torque is stably increasing.

In the control apparatus of an automatic transmission according to the first aspect of the invention, the determining portion may make a determination to allow the hydraulic pressure correction when a value obtained by integrating a difference between the target value and the value according to torque that is actually input to the automatic transmission over a predetermined period of time is equal to or less than a predetermined value.

In the control method of an automatic transmission according to the second aspect of the invention, in step b), a determination may be made to allow the correction when a value obtained by integrating a difference between the target value and the value according to torque that is actually input to the automatic transmission over a predetermined period of time is equal to or less than a predetermined value.

According to this structure or method, a determination to allow the hydraulic pressure correction is made when a value obtained by integrating the difference between the target value and the value according to torque that is actually input to the automatic transmission over a predetermined period of time is equal to or less than a predetermined value. As a result, even if the input torque of the automatic transmission changes such that the state of the automatic transmission during the gear shift may change, the hydraulic pressure can still be corrected if the input torque is stably increasing.

In the control apparatus of an automatic transmission according to the first aspect of the invention or any one of the derivative forms thereof, the value according to torque that is actually input to the automatic transmission may be an estimated value of torque that is actually input to the automatic transmission.

In the control method of an automatic transmission according to the second aspect of the invention or any one of the derivative forms thereof, the value according to torque that is actually input to the automatic transmission may be an estimated value of torque that is actually input to the automatic transmission.

According to the structure or method, a determination as to whether to allow a hydraulic pressure correction is made based on the target value and the estimated value of torque input to the automatic transmission. Accordingly, a determination as to whether to allow the hydraulic pressure correction may be made by accurately determining the state of the torque actually input to the automatic transmission.

A third aspect of the invention relates to a program that directs a computer to execute the control method of the automatic transmission according to the second aspect of the invention or any one of the derivative forms thereof.

According to the third aspect of the invention, a program is provided that directs a computer to execute the control method of the automatic transmission to inhibit a decrease in the number of opportunities to correct the hydraulic pressure.

A fourth aspect of the invention relates to a storage medium that may be read by a computer and on which the program according to the third aspect of the invention is stored.

According to the fourth aspect of the invention, a storage medium is provided on which the program that directs a computer to execute the control method of the automatic transmission to inhibit a decrease in the number of opportunities to correct the hydraulic pressure is stored.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Hereinafter, example embodiments of the invention will be described in detail with reference to the accompanying drawings. In the following description, like parts will be denoted by like reference numerals. Like parts will also be referred to by the same nomenclature and will have the same function. Therefore, detailed descriptions of those parts will not be repeated.

A vehicle provided with a control apparatus according to a first example embodiment of the invention will now be described with reference to FIG. 1. In this example embodiment, the vehicle is an FR (Front engine Rear drive) vehicle, but it may also be another type of vehicle other than an FR vehicle.

The vehicle includes an engine 1000, an automatic transmission 2000, a torque converter 2100, a planetary gear unit 3000 that forms part of the automatic transmission 2000, a hydraulic pressure circuit 4000 that also forms part of the automatic transmission 2000, a propeller shaft 5000, a differential gear 6000, rear wheels 7000, and an ECU (Electronic Control Unit) 8000. The control apparatus according to this example embodiment may be implemented by executing a program stored in ROM (Read Only Memory) 8002 of the ECU 8000, for example.

The engine 1000 is an internal combustion engine that burns a mixture of air and fuel injected from a fuel injector, not shown, in a combustion chamber of a cylinder. Force generated by the combustion of that air-fuel mixture pushes a piston in the cylinder down which causes a crankshaft to rotate. Auxiliary devices 1004 such as an alternator and a compressor of an air conditioner are driven by the driving force of the engine 1000. Incidentally, a motor may also be used as a power source instead of or in addition to the engine 1000.

The automatic transmission 2000 is connected to the engine 1000 via the torque converter 2100. The automatic transmission 2000 changes the rotational speed of the crankshaft to a desired speed by establishing a desired gear speed.

Driving force output from the automatic transmission 2000 is transmitted to left and right rear wheels 7000 via the propeller shaft 5000 and the differential gear 6000.

Various sensors and switches are connected to the ECU 8000 via a harness or the like. These sensors and switches include a position switch 8006 of a shift lever 8004, an accelerator depression amount sensor 8010 of an accelerator pedal 8008, a depression force sensor 8014 of a brake pedal 8012, a throttle opening amount sensor 8018 of an electronic throttle valve 8016, an engine speed sensor 8020, an input shaft rotational speed sensor 8022, an output shaft rotational speed sensor 8024, an oil temperature sensor 8026, and a coolant temperature sensor 8028.

The position of the shift lever 8004 is detected by the position switch 8006 and a signal indicating the detected position is output to the ECU 8000. The automatic transmission 2000 automatically establishes a gear speed according to the position of the shift lever 8004. The automatic transmission 2000 may also be structured so that a manual shift mode can be selected which enables a driver to manually select the gear speed.

The accelerator depression amount sensor 8010 detects the depression amount of the accelerator pedal 8008 and outputs a signal indicating the detected depression amount to the ECU 8000. The depression force sensor 8014 detects a depression force on the brake pedal 8012 (i.e., the force with which the driver depresses the brake pedal 8012) and outputs a signal indicating the depression force to the ECU 8000.

The throttle opening amount sensor 8018 detects an opening amount of the electronic throttle valve 8016 that is adjusted by an actuator and outputs a signal indicating the opening amount to the ECU 8000. This electronic throttle valve 8016 regulates the amount of air drawn into the engine 1000 (i.e., is used to adjust the output of the engine 1000).

Incidentally, instead of or in addition to the electronic throttle valve 8016, the amount of air drawn into the engine 1000 may also be regulated by changing the lift or duration of intake valves and exhaust valves, neither of which are shown.

The engine speed sensor 8020 detects a rotational speed of an output shaft (i.e., the crankshaft) of the engine 1000 and outputs a signal indicating the rotational speed to the ECU 8000. The input shaft rotational speed sensor 8022 detects an input shaft rotational speed NI of the automatic transmission 2000 (i.e., the turbine speed NT of the torque converter 2100) and outputs a signal indication the rotational speed thereof to the ECU 8000. The output shaft rotational speed sensor 8024 detects an output shaft rotational speed NO of the automatic transmission 2000 and outputs a signal indicating the output shaft rotational speed NO to the ECU 8000.

The oil temperature sensor 8026 detects a temperature of oil (ATF: Automatic Transmission Fluid) (i.e., oil temperature) used for operation and lubrication of the automatic transmission 2000 and outputs a signal indicating the detected temperature to the ECU 8000.

The coolant temperature sensor 8028 detects a temperature of coolant (i.e., coolant temperature) of the engine 1000 and outputs a signal indicating the detected temperature to the ECU 8000.

The ECU 8000 then controls various devices so that the vehicle will run in the desired manner, based on the various signals sent from the position switch 8006, the accelerator depression amount sensor 8010, the depression force sensor 8014, the throttle opening amount sensor 8018, the engine speed sensor 8020, the input shaft rotational speed sensor 8022, the output shaft rotational speed sensor 8024, the oil temperature sensor 8026, the coolant temperature sensor 8028, and the like, as well as programs and maps stored in the ROM 8002.

In this example embodiment, the ECU 8000 controls the automatic transmission 2000 to establish any one of eight forward gear speeds, i.e., 1st speed to 8th speed, when the D (Drive) range is selected as the shift range of the automatic transmission 2000 by the shift lever 8004 being in the D (Drive) position. When any one of those eight forward gear speeds is established, the automatic transmission 2000 is able to transmit driving force to the rear wheels 7000. Incidentally, a higher gear speed than 8th speed may also be able to be established in the D range. The established gear speed is determined based on a shift map that is created in advance through testing or the like, with has the vehicle speed and accelerator depression amount as parameters.

Figure 1:
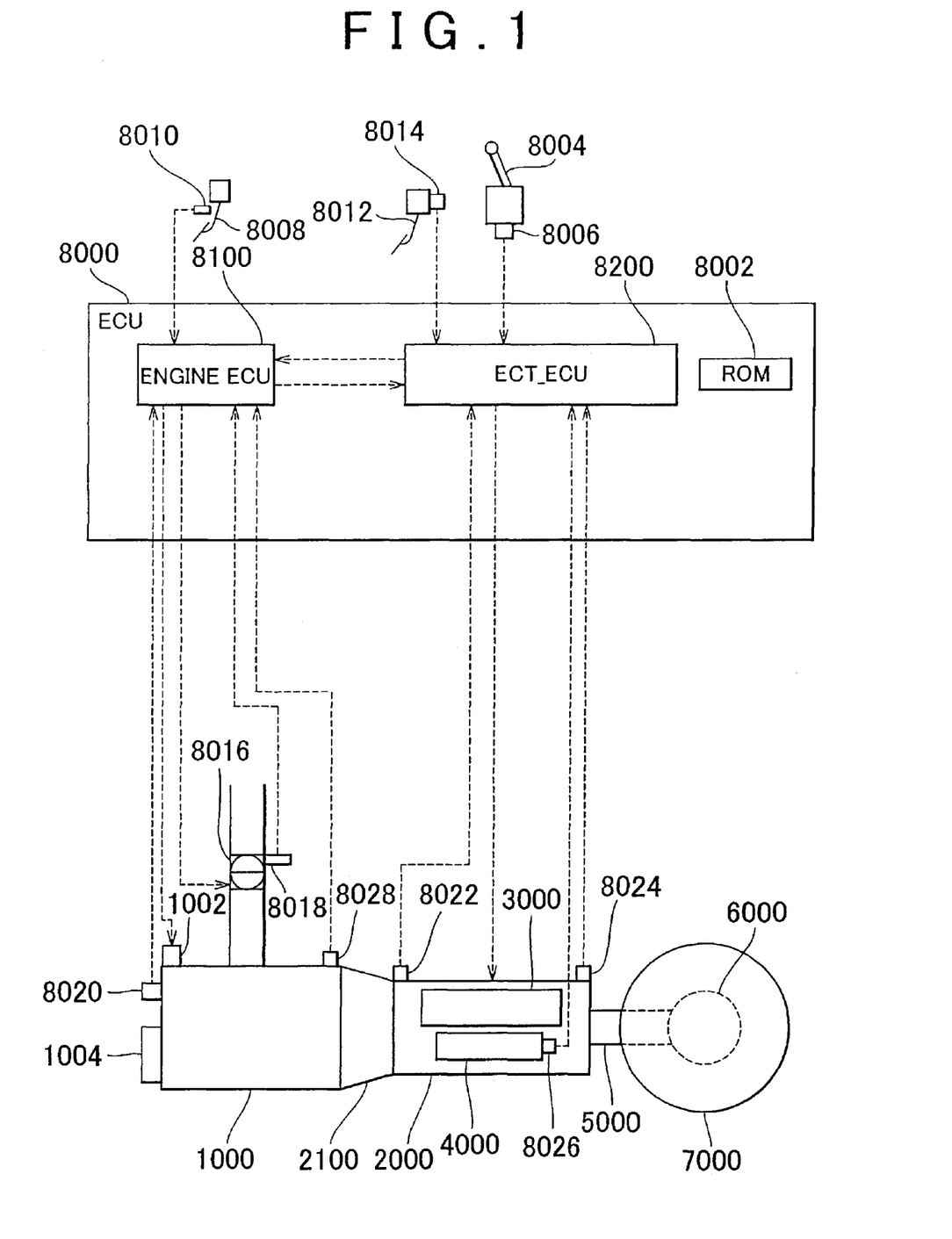
FIG. 1 is a block diagram schematically showing a powertrain of a vehicle.

As shown in FIG. 1, the ECU 8000 includes an engine ECU 8100 that controls the engine 1000 and an ECT (Electronic Controlled Transmission)_ECU 8200 that controls the automatic transmission 2000.

The engine ECU 8100 and the ECT_ECU 8200 are structured to send and receive signals to and from each other. In this example embodiment, the signal indicating the detected accelerator depression amount is output from the engine ECU 8100 to the ECT_ECU 8200. A signal indicating the target input torque, which is set as the torque to be input to the automatic transmission 2000, is output from the ECT_ECU 8200 to the engine ECU 8100.

Figure 2:
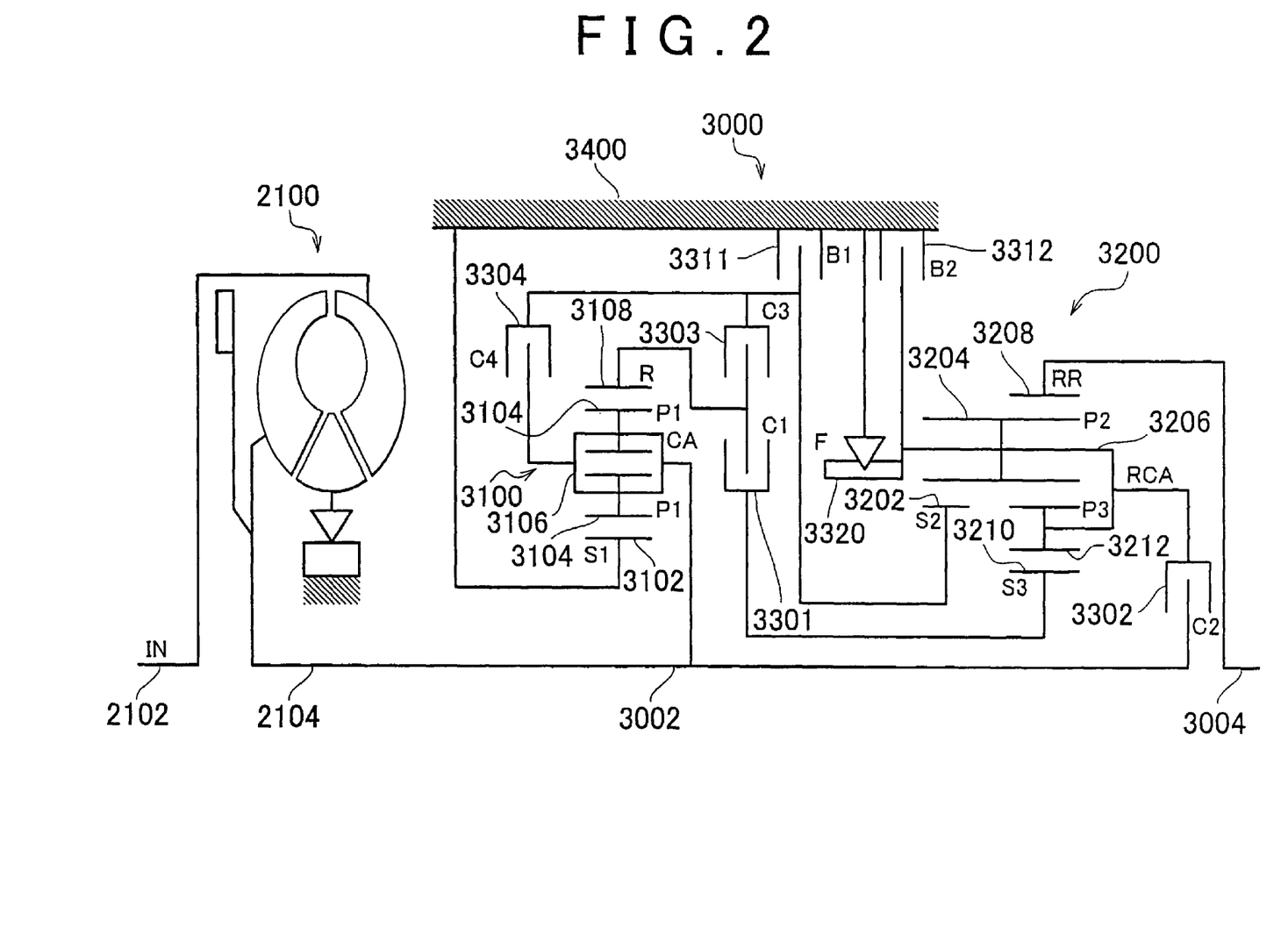
FIG. 2 is a skeleton view of a planetary gear unit in an automatic transmission.

The planetary gear unit 3000 will now be described with reference to FIG. 2. The planetary gear unit 3000 is connected to the torque converter 2100, which has an input shaft 2102 that is connected to the crankshaft.

The planetary gear unit 3000 includes a front planetary gear set 3100, a rear planetary gear set 3200, a C1 clutch 3301, a C2 clutch 3302, a C3 clutch 3303, a C4 clutch 3304, a B1 brake 3311, a B2 brake 3312, and a one-way clutch (F) 3320.

The front planetary gear set 3100 is a double pinion type planetary gear set which includes a first sun gear (S1) 3102, a pair of first pinion gears (P1) 3104, a first carrier (CA) 3106, and a first ring gear (R) 3108.

The first pinion gears (P1) 3104 are in mesh with the first sun gear (S1) 3102 and the first ring gear (R) 3108. The first carrier (CA) 3106 rotatably and revolvably supports the first pinion gears (P1) 3104.

The first sun gear (S1) 3102 is fixed to a gear case 3400 so as not to be able to rotate. The first carrier (CA) 3106 is connected to the input shaft 3002 of the planetary gear unit 3000.

The rear planetary gear set 3200 is a Ravigneaux type planetary gear set which includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

The second pinion gear (P2) 3204 is in mesh with the second sun gear (S2) 3202, the rear ring gear (RR) 3208, and the third pinion gear (P3) 3212. The third pinion gear (P3) 3212 is in mesh with the third sun gear (S3) 3210 in addition to the second pinion gear (P2) 3204.

The rear carrier (RCA) 3206 rotatably and revolvably supports the second pinion gear (P2) 3204 and the third pinion gear (P3) 3212. The rear carrier (RCA) 3206 is connected to the one-way clutch (F) 3320. The rear carrier (RCA) 3206 is unable to rotate when driving in 1st gear (i.e., when driving using driving force output from the engine 1000). The rear ring gear (RR) 3208 is connected to the output shaft 3004 of the planetary gear unit 3000.

The one-way clutch (F) 3320 is provided in parallel with the B2 brake 3312. That is, an outer race of the one-way clutch (F) 3320 is fixed to the gear case 3400, while the inner race is connected to the rear carrier (RCA) 3206.

Figure 3:
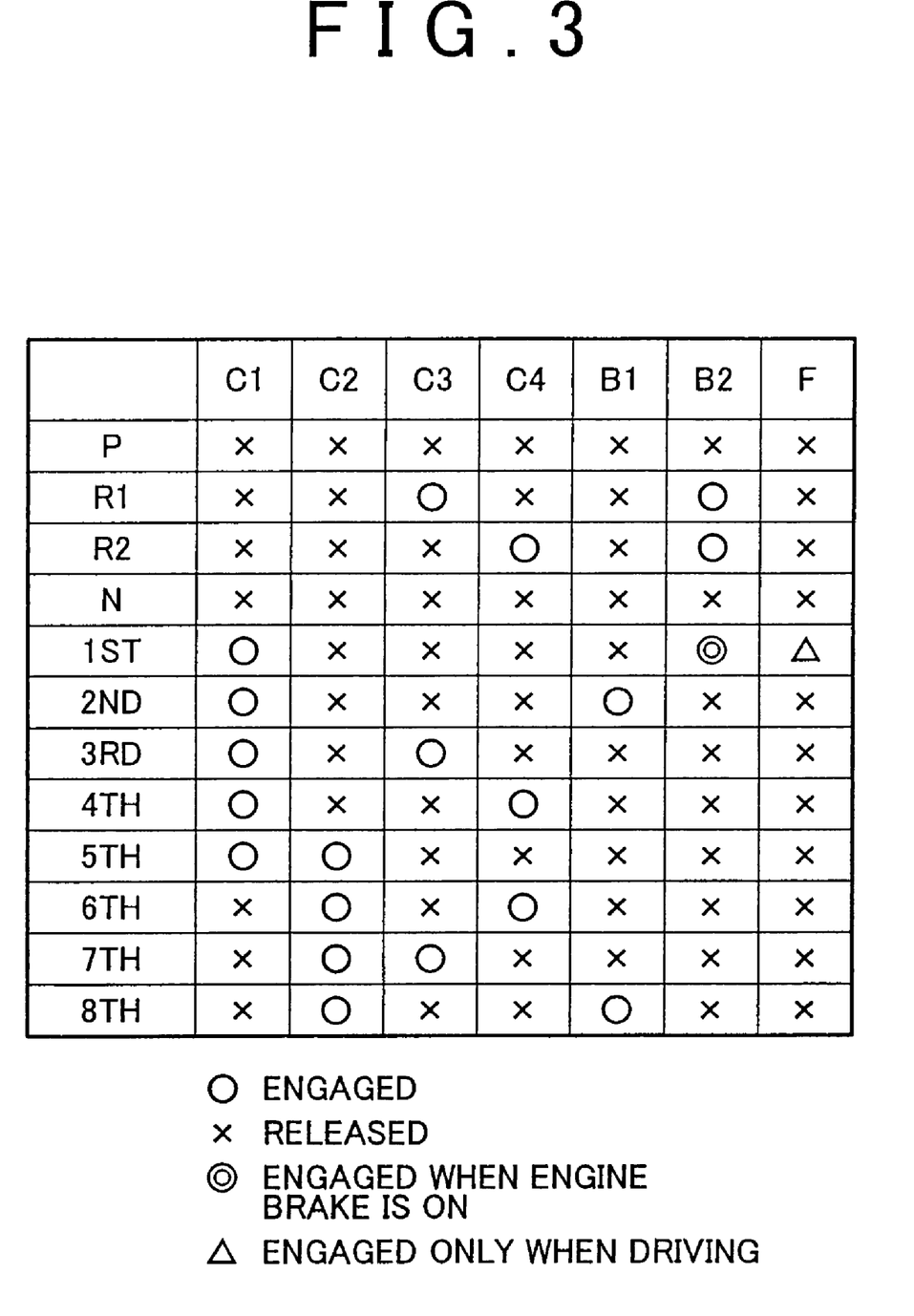
FIG. 3 is a clutch and brake engagement chart for the automatic transmission.

FIG. 3 is a clutch and brake engagement chart showing the relationship between the gear speeds and the operating states of various clutches and brakes. Eight forward gear speeds, i.e., 1st to 8th gear, and two reverse gear speeds, 1st and 2nd, are established by operating the various brakes and clutches in the combinations shown in this clutch and brake engagement chart.

The main portions of the hydraulic pressure circuit 4000 will now be described with reference to FIG. 4. It should be noted that the hydraulic pressure circuit 4000 is not limited to the structure described below.

The hydraulic pressure circuit 4000 includes an oil pump 4004, a primary regulator valve 4006, a manual valve 4100, a solenoid modulator valve 4200, an SL1 linear solenoid (hereinafter referred to simply as SL (1)) 4210, an SL2 linear solenoid (hereinafter referred to simply as SL (2)) 4220, an SL3 linear solenoid (hereinafter referred to simply as SL (3)) 4230, an SL4 linear solenoid (hereinafter referred to simply as SL (4)) 4240, an SL5 linear solenoid (hereinafter referred to simply as SL (5)) 4250, an SLT linear solenoid (hereinafter referred to simply as SLT) 4300, and a B2 control valve 4500.

The oil pump 4004 is connected to the crankshaft of the engine 1000. As the crankshaft rotates, it drives the oil pump 4004, which generates hydraulic pressure. Hydraulic pressure generated by the oil pump 4004 is regulated by the primary regulator valve 4006 and becomes the line pressure.

The primary regulator valve 4006 operates with the throttle pressure that has been regulated by the SLT 4300 as the pilot pressure. Line pressure is supplied to the manual valve 4100 via a line pressure passage 4010.

The manual valve 4100 includes a drain port 4105. Hydraulic pressure in a D range pressure passage 4102 and an R range pressure passage 4104 is discharged from this drain port 4105. When the spool of the manual valve 4100 is in the D position, the line pressure passage 4010 is communicated with the D range pressure passage 4102 such that hydraulic pressure is supplied to the D range pressure passage 4102. At this time, the R range pressure passage 4104 is communicated with the drain port 4105 so R range pressure in the R range pressure passage 4104 is discharged from the drain port 4105.

When the spool of the manual valve 4100 is in the R position, the line pressure passage 4010 is communicated with the R range pressure passage 4104 such that hydraulic pressure is supplied to the R range pressure passage 4104. At this time, the D range pressure passage 4102 is communicated with the drain port 4105 such that D range pressure in the D range pressure passage 4102 is discharged from the drain port 4105.

When the spool of the manual valve 4100 is in the N position, both the D range pressure passage 4102 and the R range pressure passage 4104 are communicated with the drain port 4105 such that the D range pressure in the D range pressure passage 4102 and the R range pressure in the R range pressure passage 4104 are discharged from the drain port 4105.

The hydraulic pressure supplied to the D range pressure passage 4102 is ultimately supplied to the C1 clutch 3301, the C2 clutch 3302, and the C3 clutch 3303. The hydraulic pressure supplied to the R range pressure passage 4104 is ultimately supplied to the B2 brake 3312.

The solenoid modulator valve 4200 makes the line pressure a base pressure and regulates the hydraulic pressure supplied to the SLT 4300 (i.e., the solenoid modulator pressure) to a constant pressure.

The SL (1) 4210 regulates the hydraulic pressure supplied to the C1 clutch 3301, the SL (2) 4420 regulates the hydraulic pressure supplied to the C2 clutch 3302, the SL (3) 4230 regulates the hydraulic pressure supplied to the C3 clutch 3303, the SL (4) 4240 regulates the hydraulic pressure supplied to the C4 clutch 3304, and the SL (5) 4250 regulates the hydraulic pressure supplied to the B1 brake 3311.

The SLT 4300 regulates the solenoid modulator pressure according to a control signal from the ECU 8000 based on the accelerator depression amount detected by the accelerator depression amount sensor 8010 to generate a throttle pressure. This throttle pressure is supplied to the primary modulator valve 4006 via an SLT passage 4302. The throttle pressure is used as the pilot pressure of the primary regulator valve 4006.

The SL (1) 4210, SL (2) 4220, SL (3) 4230, SL (4) 4240, SL (5) 4250, and SLT 4300 are all controlled according to control signals output from the ECU 8000.

The B2 control valve 4500 selectively supplies the B2 brake 3312 with hydraulic pressure from either the D range pressure passage 4102 or the R range pressure passage 4104, both of which are connected to the B2 control valve 4500. The B2 control valve 4500 is controlled by hydraulic pressure supplied from an SLU solenoid valve, not shown, and the impelling force of a spring.

Figure 5:
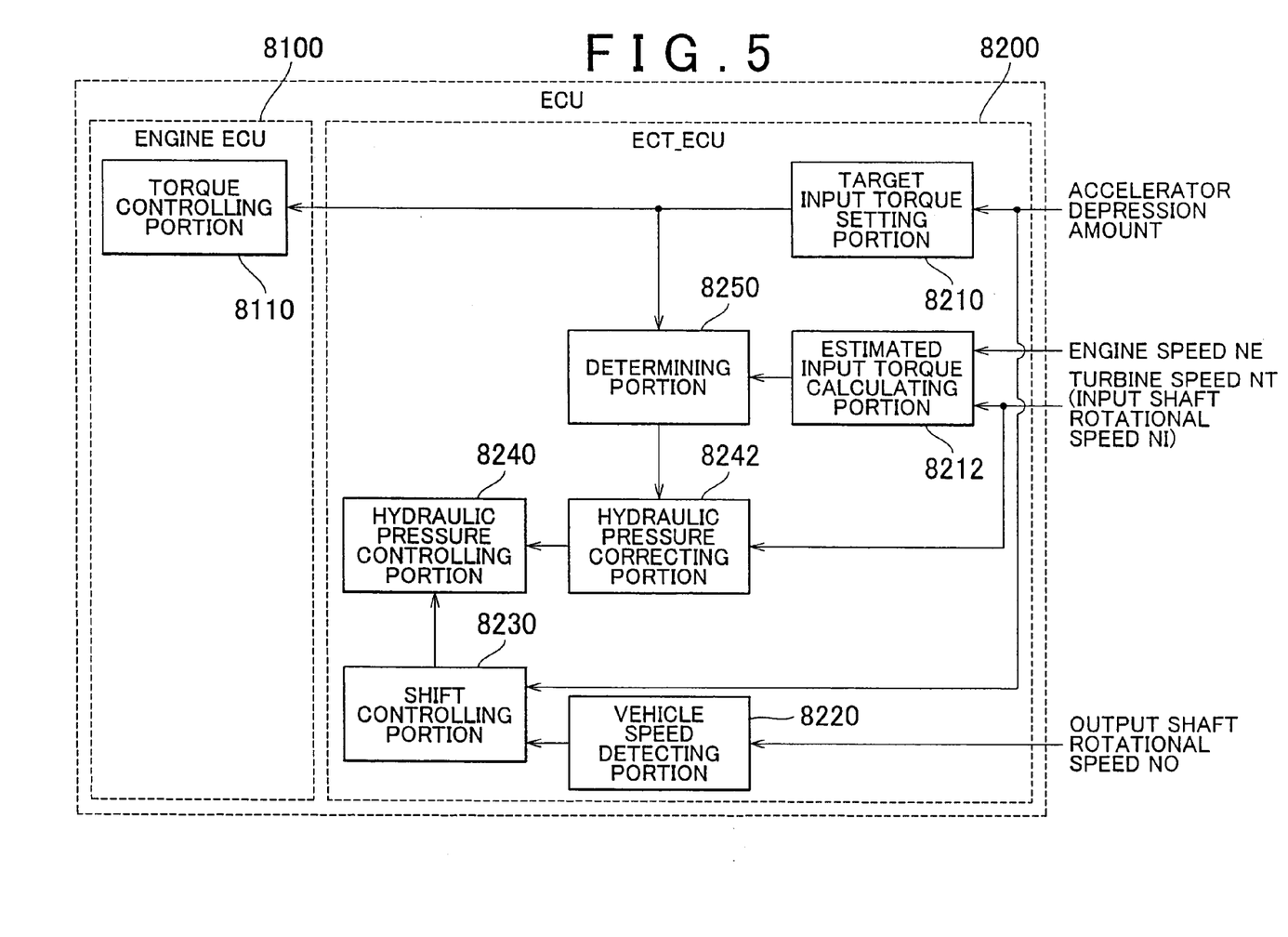
FIG. 5 is a functional block diagram of an ECU.

When the SLU solenoid valve is on, the B2 control valve 4500 is in the state shown on the left side of the valve in FIG. 5. In this case, hydraulic pressure, which is the regulated D range pressure, is supplied to the B2 brake 3312 with the hydraulic pressure supplied from the SLU solenoid valve as the pilot pressure.

Figure 4:
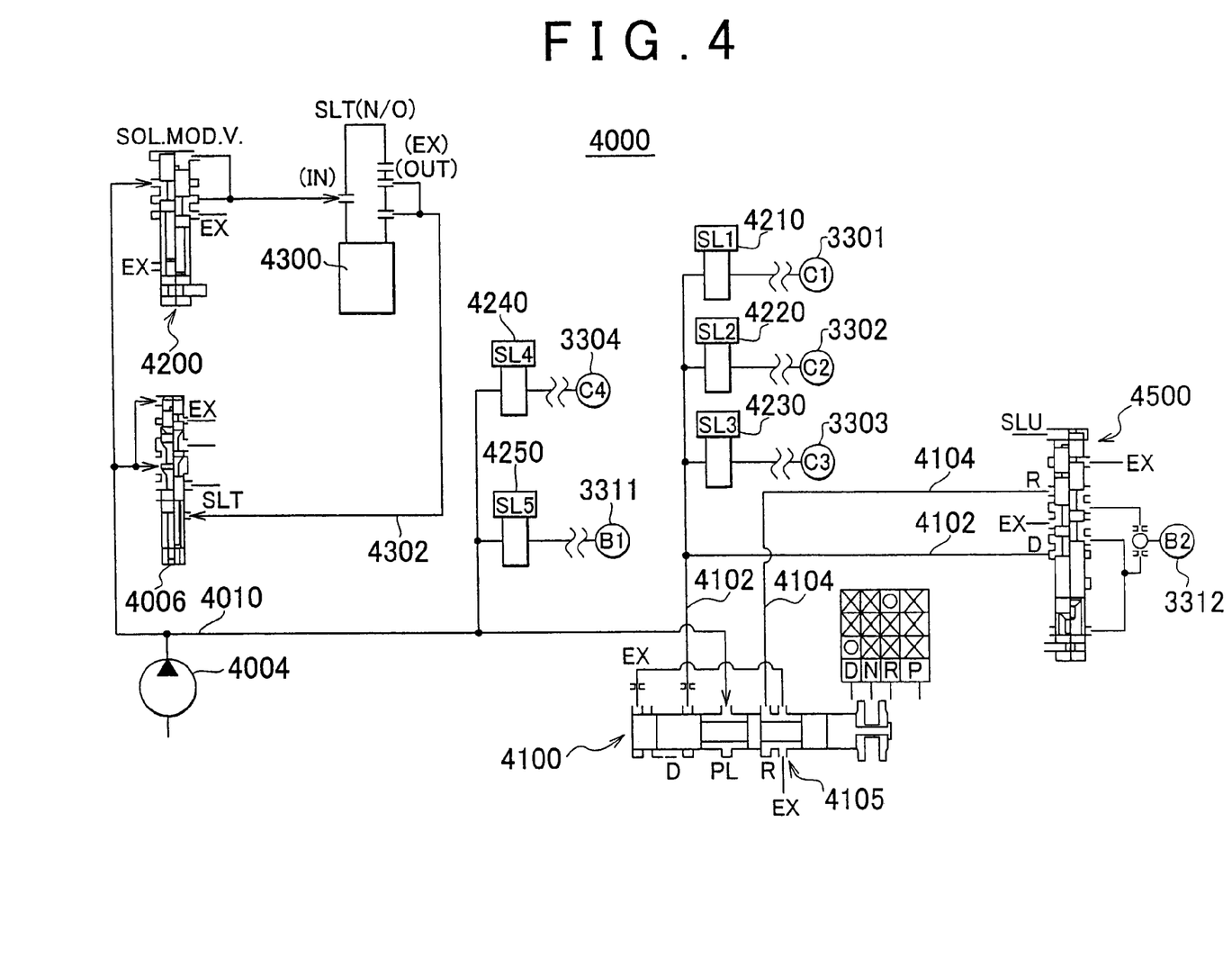
FIG. 4 is a diagram of a hydraulic pressure circuit of the automatic transmission.

When the SLU solenoid valve is off, the B2 control valve 4500 is in the state shown on the right side of the valve in FIG. 4. In this case, the R range pressure is supplied to the B2 brake 3312.

The ECU 8000 will now be described in more detail with reference to FIG. 5. The functions of the ECU 8000 described below may be implemented through either hardware or software.

The engine ECU 8100 of the ECU 8000 includes a torque controlling portion 8110. The torque controlling portion 8110 receives a signal indicating the target input torque from the ECT_ECU 8200 and controls the throttle opening amount of the electronic throttle valve 8016 and the ignition timing by a spark plug and the like such that torque corresponding to that target input torque is output by the engine 1000.

ECT_ECU 8200 of the ECU 8000 includes a target input torque setting portion 8210, an estimated input torque calculating portion 8212, a vehicle speed detecting portion 8220, a shift controlling portion 8230, a hydraulic pressure controlling portion 8240, a hydraulic pressure correcting portion 8242, and a determining portion 8250.

The target input torque setting portion 8210 sets the target input torque of the automatic transmission 2000 based on the accelerator depression amount and the like.

The estimated input torque calculating portion 8212 calculates an estimated input torque, which is an estimated value of torque actually input to the automatic transmission 2000, based on the engine speed NE and the turbine speed NT (i.e., input shaft rotational speed NI) and the like. Any known common method may be used to calculate the estimated input torque so a detailed description will not be repeated here.

The vehicle speed detecting portion 8220 calculates (detects) the vehicle speed from the output shaft rotational speed NO of the automatic transmission 2000.

Figure 6:
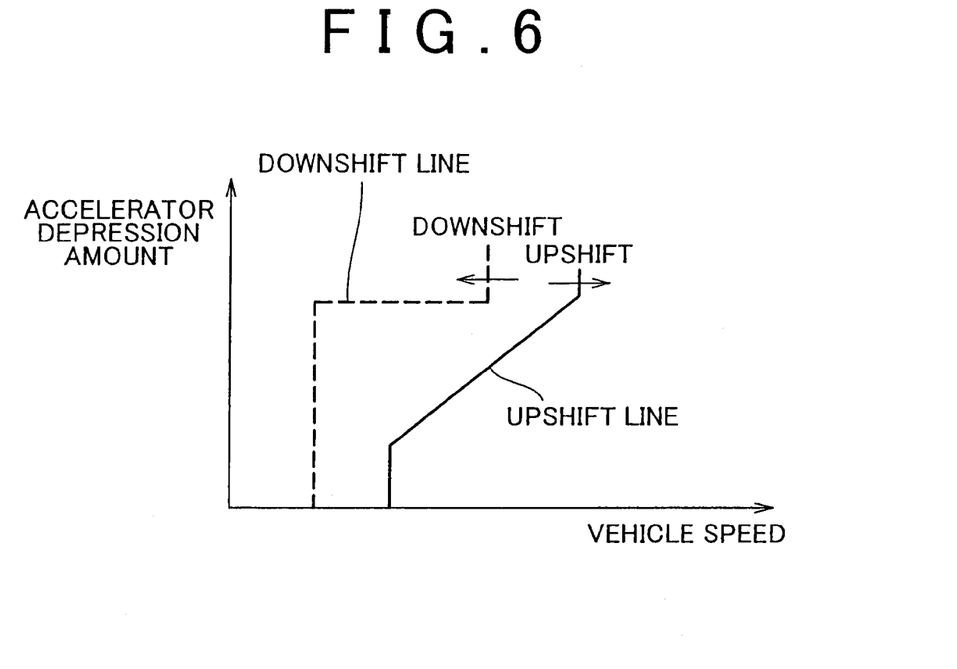
FIG. 6 is a shift line graph.

The shift controlling portion 8230 performs an upshift or a downshift according to a shift line diagram (i.e., a shift map) that has the vehicle speed and the accelerator depression amount as parameters, as shown in FIG. 6. In the shift map, an upshift line and a downshift line are set for each type of shift (for each combination of the gear speed before the shift and the gear speed after the shift). When a shift is performed, friction engagement elements (i.e., the clutches and brakes) are normally engaged in the appropriate combination from among the various combinations shown in the clutch and brake engagement chart in FIG. 3 described above.

The hydraulic-pressure controlling portion 8240 controls the hydraulic pressure supplied to the friction engagement elements. A hydraulic-pressure correcting portion 8242 corrects (i.e., learn corrects) the hydraulic pressure supplied to the friction engagement elements during a downshift when an acceleration operation to increase the accelerator depression amount (hereinafter this kind of a downshift may also be referred to as a "power-on downshift") is performed. The hydraulic-pressure correcting portion 8242 corrects the hydraulic pressure when a determination has been made by the determining portion 8250, to be described later, to allow a correction. A shift in which the hydraulic pressure is corrected is not limited to a power-on downshift.

Figure 7:
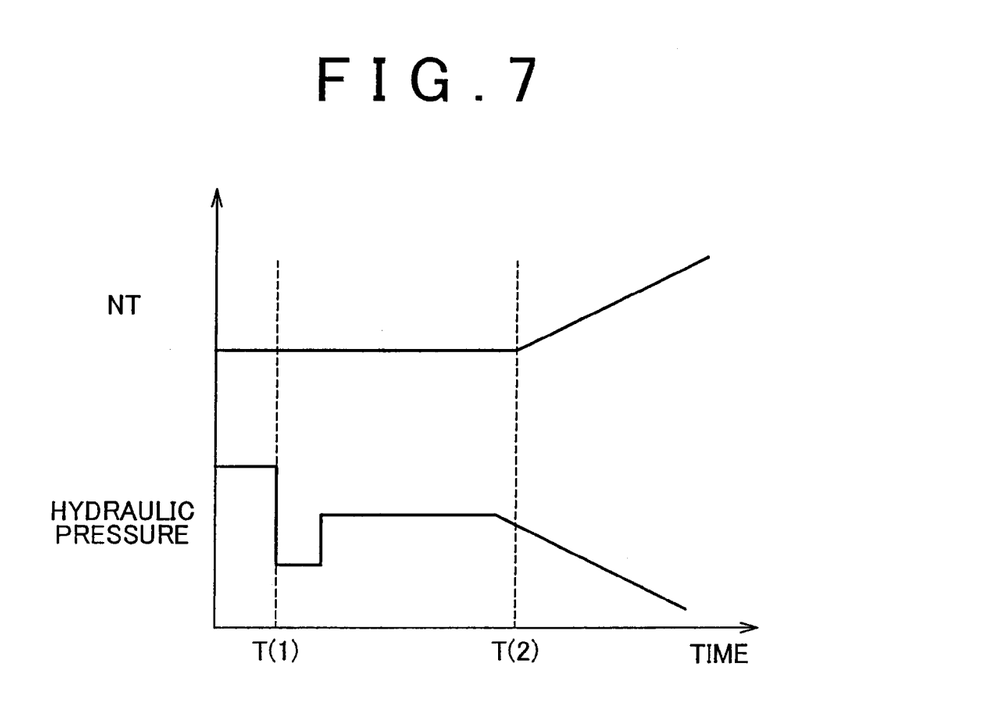
FIG. 7 is a timing chart showing the shifts in the hydraulic pressure supplied to a friction engagement element and the turbine speed during a power-on downshift.

The hydraulic pressure correcting portion 8242 corrects the hydraulic pressure supplied to the friction engagement element to be released by the shift based on the time period ΔT from the time T (1) that the shift starts until the time T (2) that the turbine speed NT (i.e., the input shaft rotational speed NI) starts to increase.

If the time period ΔT from the time T (1) that the shift starts until the time T (2) that the turbine speed NT (i.e., the input shaft rotational speed NI) starts to increase is longer than a threshold value, the hydraulic pressure supplied to the friction engagement element to be released by the shift is reduced. On the other hand, if that time period ΔT is shorter than the threshold value, the hydraulic pressure supplied to the friction engagement element to be released by the shift is increased.

Also, the hydraulic pressure correcting portion 8242 corrects the hydraulic pressure supplied to the friction engagement element to be engaged by the shift based on the amount of overspeed of the turbine speed NT or the engine speed NE during a gear shift. If the amount of overspeed is large, the hydraulic pressure is set high. On the other hand, if the amount of overspeed is small, the hydraulic pressure is set low. The method used to correct the hydraulic pressure is not limited to these, however. For example, the hydraulic pressure may also be corrected using the output shaft rotational speed NO instead of the turbine rotational speed NT. Any known common method may be used to correct the hydraulic pressure so a more detailed description will not be repeated here.

Figure 8:
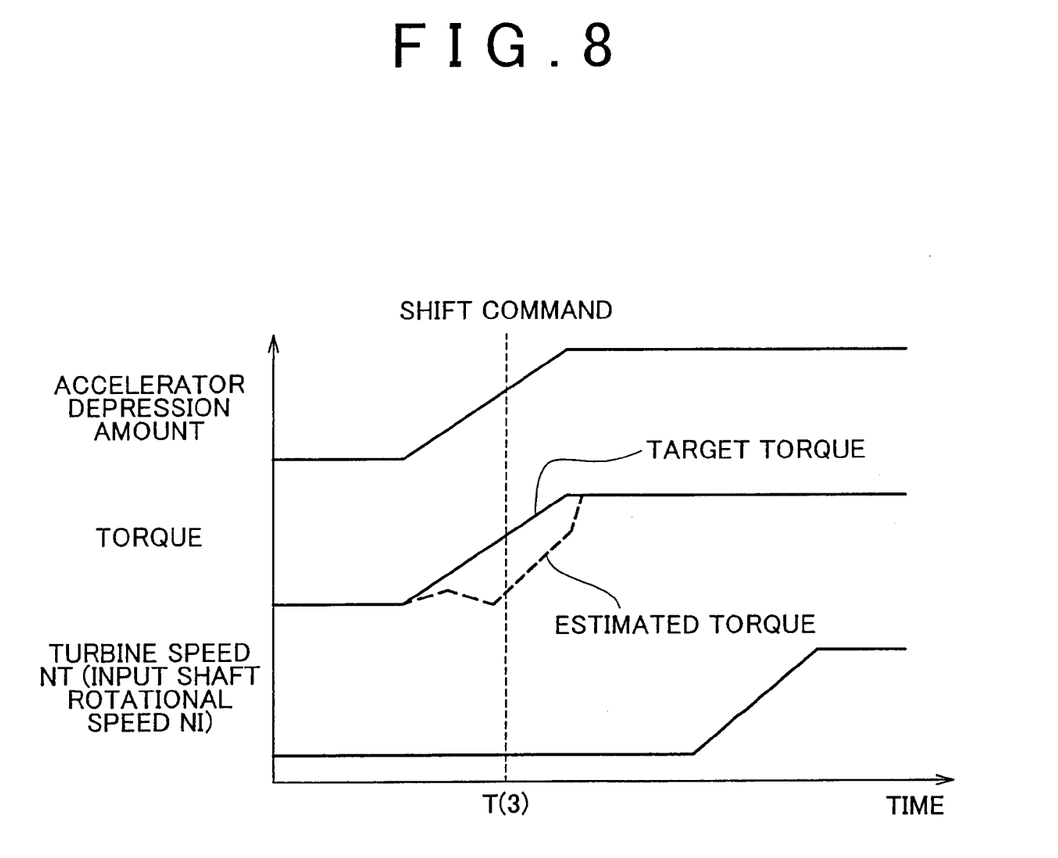
FIG. 8 is a timing chart showing the shifts in the accelerator opening amount, target input torque, estimated input torque, and turbine speed during a power-on downshift.

The determining portion 8250 determines whether a correction of the hydraulic pressure by the hydraulic-pressure correcting portion 8242 is allowed based on the target input torque and the estimated input torque. In this example embodiment, the determining portion 8250 makes a determination to allow the correction when, as shown in FIG. 8, the difference between the target input torque shown by the solid line and the estimated input torque shown by the broken line is equal to or less than a threshold value ΔTT (1) before or after time T (3) when a shift command is output from the ECT_ECU 8200, for example. The method for determining whether the correction is allowed is not limited to this, however.

Figure 9:
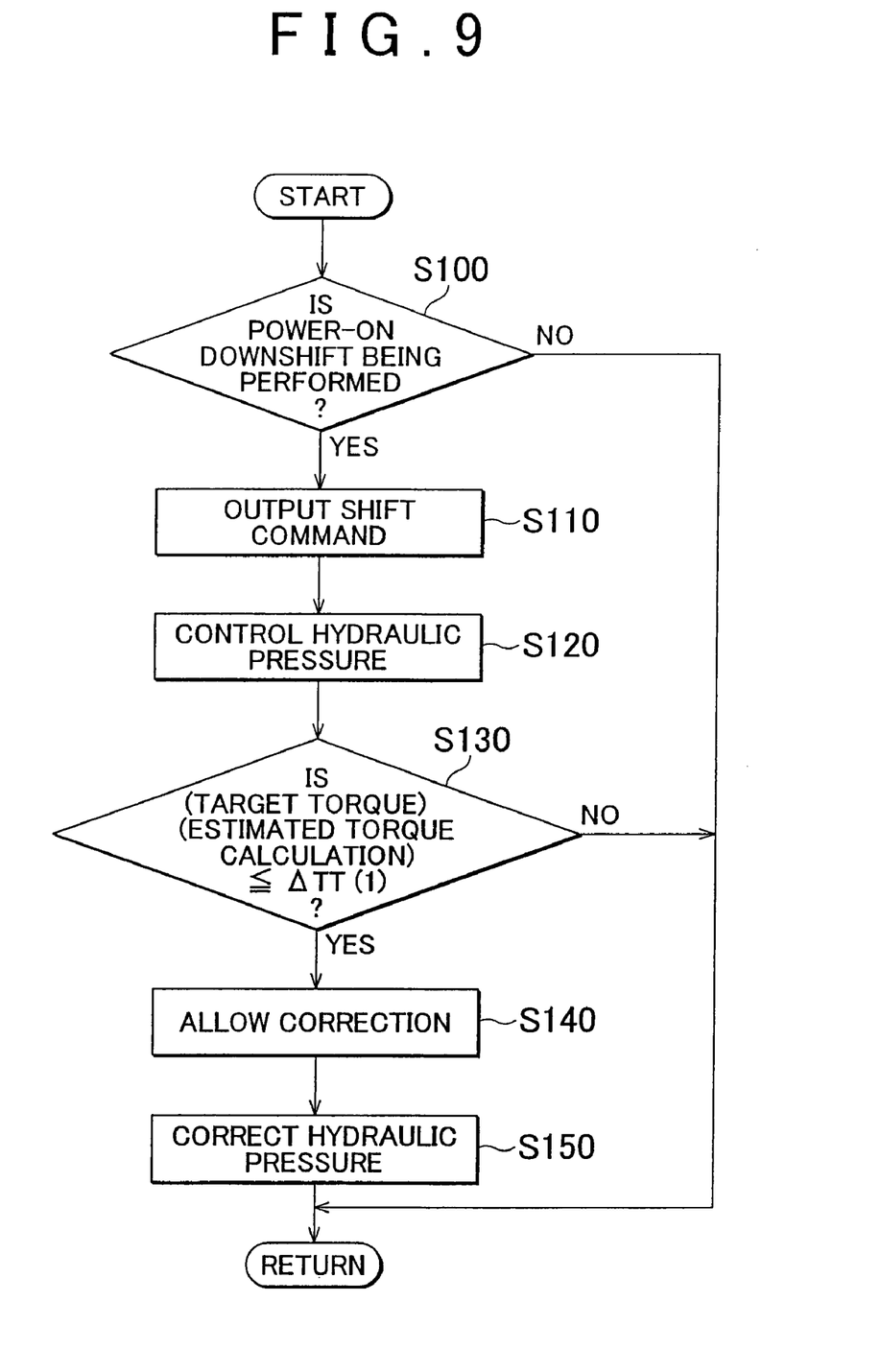
FIG. 9 is a flowchart of a program executed by the ECU which serves as a control apparatus according to a first example embodiment of the invention.

The control structure of a program executed by the ECU 8000, which serves as a control apparatus in this example embodiment, will now be described with reference to FIG. 9. The program described below is periodically executed at predetermined intervals.

In step S100, the ECU 8000 determines whether to perform a power-on downshift based on the shift map. If the ECU 8000 makes a determination to perform a power-on downshift (i.e., YES in step S100), the process proceeds on to step S110. If not (i.e., NO in step S100), this routine ends.

In step S110, the ECU 8000 outputs a shift command. In step S120, the ECU 8000 controls the hydraulic pressure supplied to the friction engagement element to perform the power-on downshift.

In step S130, the ECU 8000 determines whether the difference between the target input torque and the estimated input torque is equal to or less than the threshold value ΔTT (1) before or after the shift command is output. If the difference between the target input torque and the estimated input torque is equal to or less than the threshold value ΔTT (1) before or after the shift command is output (i.e., YES in step S130), the process proceeds to step S140. If not (i.e., NO in step S130), this routine ends.

In step S140, the ECU 8000 allows the correction of the hydraulic pressure supplied to the friction engagement element during the power-on downshift. In step S150, the ECU 8000 corrects the hydraulic pressure supplied to the friction engagement element during the power-on downshift.

The operation of the ECU 8000, which is based on the foregoing structure and flowchart, will now be described.

While the vehicle is running, if it is determined that a power-on downshift will be performed (i.e., YES in step S100), a shift command is output (S110). The hydraulic pressure supplied to the friction engagement element is then controlled to perform the power-on downshift (S120).

During a power-on downshift, the accelerator depression amount is increased. In this case, in order to suppress a sudden increase in torque output from the engine 1000, a control may be performed to suppress the output of the engine 1000, such as tip-in control that reduces the throttle opening amount so that it is smaller than it is during normal operation.

When this kind of control is performed, an increase in the turbine speed NT during a gear shift is suppressed regardless of the amount of hydraulic pressure supplied to the friction engagement element. Therefore, if the hydraulic pressure is corrected based on the state of the automatic transmission 2000, such as the turbine speed NT, during the gear shift, the correction may be erroneous.

Therefore, when control such as tip-in control is performed to change the output of the engine 1000, it is preferable that the hydraulic pressure not be corrected. On the other hand, it is also preferable to have as many opportunities as possible to correct the hydraulic pressure.

Thus, in this example embodiment, when the difference between the target input torque and the estimated input torque is equal to or less than the threshold value ΔATT (1) (i.e., YES in step S130), correction of the hydraulic pressure supplied to the friction engagement element during a power-on downshift is allowed (S140).

That is, a correction of the hydraulic pressure is allowed when the difference between the target input torque and the estimated input torque is small and the torque that is actually input to the automatic transmission 2000 is stably increasing.

When the correction of the hydraulic pressure is allowed, the hydraulic pressure supplied to the friction engagement element during the power-on downshift is corrected (S150). As a result, the number of opportunities to correct the hydraulic pressure may be increased, thus enabling a preferable hydraulic pressure to be obtained during the power-on downshift. As a result, shock that can occur during a power-on downshift may be reduced and the response of the power-on downshift is improved.

As described above, a correction of the hydraulic pressure supplied to the friction engagement element during a power-on downshift is allowed when the difference between the target input torque and the estimated input torque is equal to or less than the threshold value ΔTT (1). If the hydraulic pressure correction is allowed, the hydraulic pressure supplied to the friction engagement element during the power-on downshift is corrected. Therefore, the hydraulic pressure may be corrected when the difference between the target input torque and the estimated input torque is small and the torque that is actually input to the automatic transmission is stably increasing. This increases the number of opportunities to correct the hydraulic pressure.

A second example embodiment of the invention will hereinafter be described. The second example embodiment differs from the first example embodiment in that a determination as to whether a correction of the hydraulic pressure is allowed is made based on an integral value obtained by integrating the difference between the target input torque and the estimated input torque over a predetermined period of time. The configuration other than the above in the second example embodiment, as well as the functions thereof, is the same as in the first example embodiment so a detailed description thereof will not be repeated here.

Figure 10:
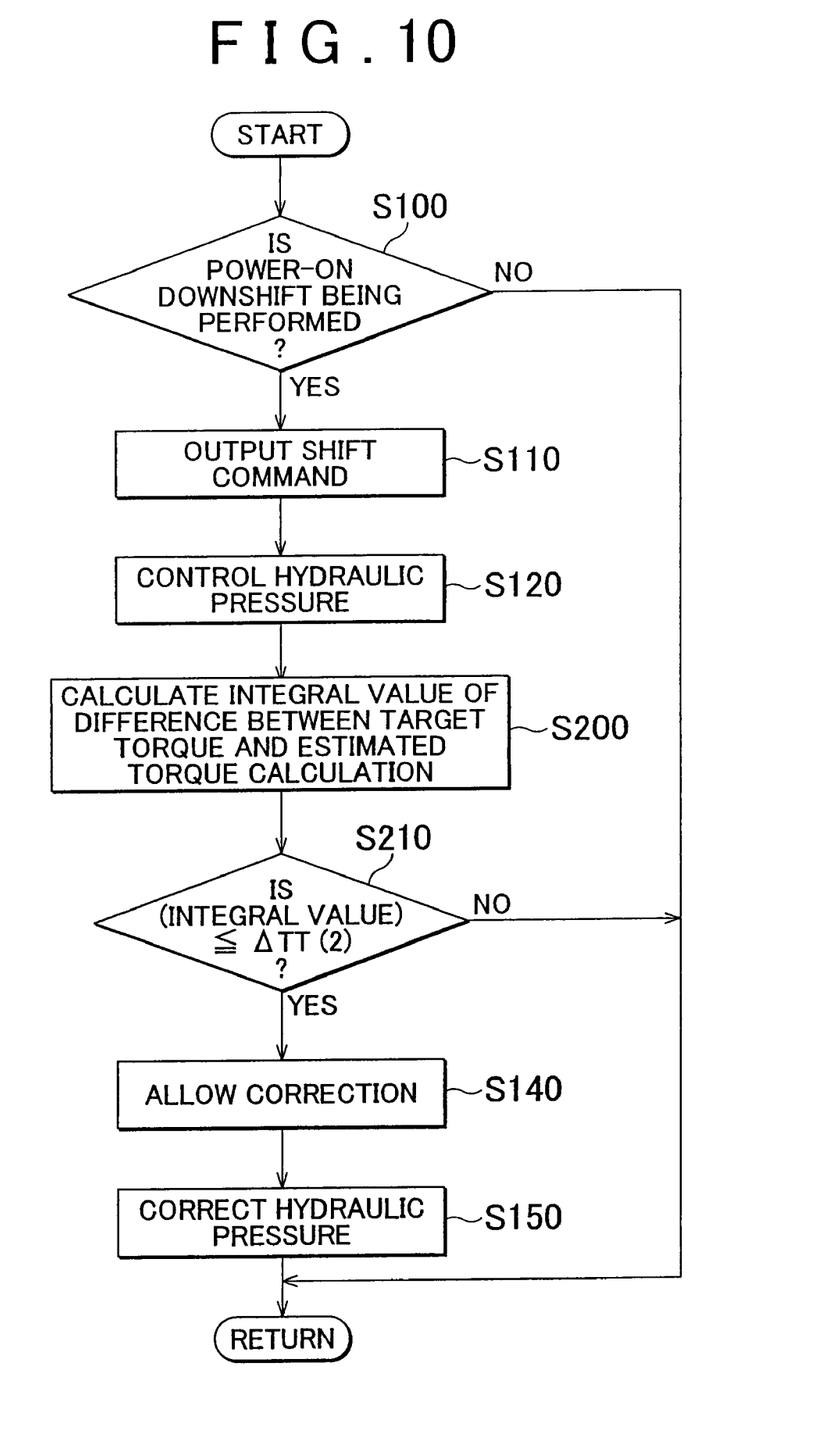
FIG. 10 is a flowchart of a program executed by the ECU which serves as a control apparatus according to a second example embodiment of the invention.

The control structure of a program executed by the ECU 8000, which serves as a control apparatus in this example embodiment, will now be described with reference to FIG. 10. Steps in the second example embodiment that are the same as steps in the first example embodiment will be denoted by the same step numbers so detailed descriptions thereof will not be repeated here.

In step S200, the ECU 8000 calculates an integral value obtained by integrating the difference between the target input torque and the estimated input torque over a predetermined period of time.

In step S210, the ECU 8000 determines whether the calculated integral value is equal to or less than a threshold value ΔTT (2). If the integral value is equal to or less than the threshold value ΔTT (2) (i.e., YES in step S210), the process proceeds on to step S140. If not (i.e., NO in step S210), this routine ends.

With this configuration as well, the same advantageous effects as those obtained with the first example embodiment described above can be obtained.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. A control apparatus of an automatic transmission that establishes a gear speed by engaging a friction engagement element that is operated by hydraulic pressure, the control apparatus comprising:
   a hydraulic pressure controlling portion that controls hydraulic pressure supplied to the friction engagement element;
   a determining portion that determines whether a correction of the hydraulic pressure supplied to the friction engagement element during a gear shift is allowed based on a target input torque to be input to the automatic transmission during the gear shift and a torque that corresponds to an actual input torque to be actually input to the automatic transmission; and
   a hydraulic pressure correcting portion that corrects the hydraulic pressure based on a state of the automatic transmission during the gear shift when the determining portion determines that the correction is allowed, wherein
   the determining portion calculates an integral value by integrating a difference between the target input torque and the torque that corresponds to the actual input torque over a predetermined period of time, and compares the integral value with a predetermined value, and wherein if the integral value is equal to or less than the predetermined value, the determining portion allows the correction.

2. The control apparatus of an automatic transmission according to claim 1, wherein the torque that corresponds to the actual input torque is an estimated value of torque that is actually input to the automatic transmission.

3. The control apparatus of an automatic transmission according to claim 1, wherein the automatic transmission includes eight forward gear speeds.

4. The control apparatus of an automatic transmission according to claim 3, wherein the automatic transmission further includes two reverse gear speeds.

5. The control apparatus of an automatic transmission according to claim 1, wherein the determining portion performs the determination during a downshift of the automatic transmission, the downshift being performed when an accelerator depression amount increases.

6. The control apparatus of an automatic transmission according to claim 1, wherein the control apparatus prohibits the correction unless the gear shift is a power-on downshift.

7. A method of controlling an automatic transmission that establishes a gear speed by engaging a friction engagement element that is operated by hydraulic pressure, the method comprising:
   controlling hydraulic pressure supplied to the friction engagement element;
   determining whether a correction of the hydraulic pressure supplied to the friction engagement element during a gear shift is allowed based on a target input torque to be input to the automatic transmission during the gear shift and a torque that corresponds to an actual input torque to be actually input to the automatic transmission, the determining further comprising
   calculating an integral value by integrating a difference between the target input torque and the torque that corresponds to the actual input torque over a predetermined period of time, comparing the integral value with a predetermined value, and allowing the correction when the integral value is equal to or less than the predetermined value; and
   correcting the hydraulic pressure based on a state of the automatic transmission during the gear shift when it is determined that the correction is allowed.

8. The control method of an automatic transmission according to claim 7, wherein torque that corresponds to the actual input torque is an estimated value of torque that is actually input to the automatic transmission.

9. The control method of an automatic transmission according to claim 7, wherein the determination is made during a downshift of the automatic transmission, the downshift being performed when an accelerator depression increases.

10. A non-transitory computer-readable storage medium on which a program for directing a computer to execute the control method of an automatic transmission according to claim 7 is stored.

11. The control method of an automatic transmission according to claim 7, wherein the correcting is prohibited unless the gear shift is a power-on downshift.

* * * * *